United States Patent Office 2,823,541
Patented Feb. 18, 1958

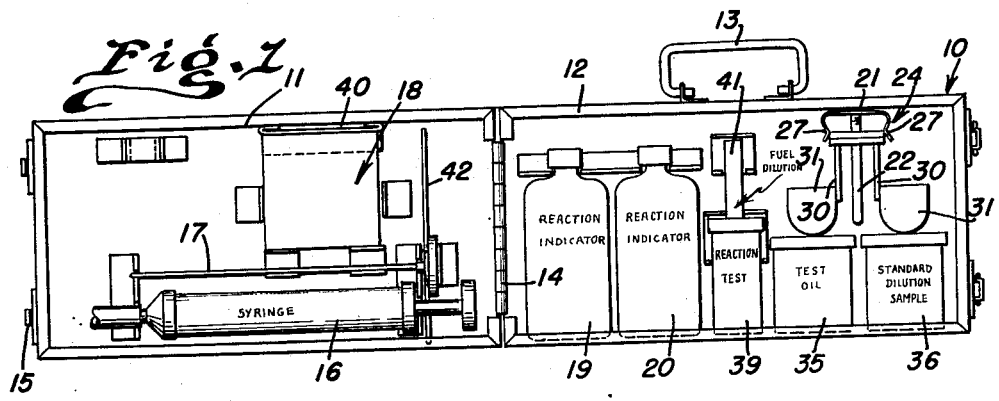
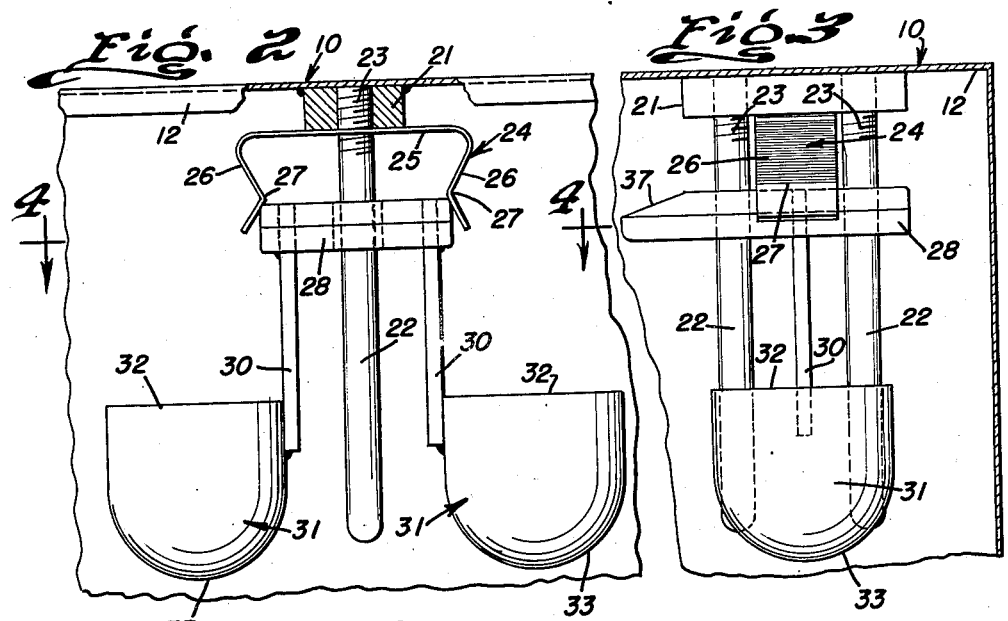
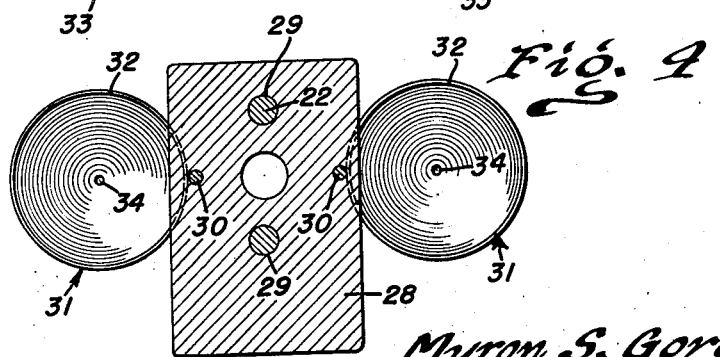
Feb. 18, 1958  M. S. GORDON ET AL  2,823,541
VISCOSITY COMPARATOR
Filed Feb. 16, 1956
INVENTOR.
Myron S. Gordon
John R. Belt
By Sherman Levy ATTORNEY

2,823,541

VISCOSITY COMPARATOR

Myron S. Gordon, Annapolis, and John R. Belt, Severna Park, Md.; said Belt assignor to said Gordon Application February 16, 1956, Serial No. 565,926

3 Claims. (Cl. 73—56)

This invention relates to the testing of oil, such as lubricating oil, and more particularly to a kit for use in testing such oil.

The object of the invention is to provide a kit containing the necessary equipment which can be used for testing lubricating oil, so as to ascertain the characteristics of the oil, such as contamination, reaction, fuel dilution, and viscosity.

Another object of the invention is to provide an oil testing kit which includes a novel means for testing the dilution of a sample of oil, such as lubricating oil, whereby the viscosity of two or more liquids can be determined or compared without the use of heaters, thermometers, stop watches, or the like.

Another object of the invention is to provide an oil testing kit which is portable, unbreakable, and which requires no electricity and which is very easy to clean, the kit including a viscosity comparing device which permits an accurate determination to be made of the dilution of the oil.

A further object of the invention is to provide an oil test kit which is extremely simple and inexpensive to manufacture.

Other objects and advantages will be apparent during the course of the following description.

In the accompanying drawings forming a part of this application, and in which like numerals are used to designate like parts throughout the same:

Figure 1 is an elevational view of the test kit, showing the kit or case in open position ready to be used;

Figure 2 is an enlarged elevational view with parts broken away and in section, showing the viscosity comparator;

Figure 3 is a view taken at right angles to the view shown in Figure 2;

Figure 4 is a sectional view taken on the line 4—4 of Figure 2.

Referring in detail to the drawings, the numeral 10 designates the case or kit, which can be made of any suitable material, and the kit 10 includes a pair of similar body members 11 and 12, which may be hingedly connected together through the medium of a hinge joint 14. A handle 13 may be provided for carrying the case, and latches 15 may be provided for retaining the case or kit in closed position.

Arranged within the case or kit 10 is a syringe 16 which can be used for withdrawing a sample of oil from a crankcase or the like, and also arranged in the case 10 is a thermometer 17. The numeral 18 designates an area which can be used for supporting filter paper or the like.

Also arranged in the case 10 are containers 19 and 20 for holding various fluids, as later described in this application.

The present invention further includes a device for measuring or determining the dilution of the oil being tested, and this device is shown in detail in Figures 2, 3 and 4.

The dilution measuring or testing assembly includes a support member at 21 which may be secured in any suitable manner, as for example by welding, to the top of the body member 12. There is further provided a pair of guide pins 22 which may have threaded end portions 23 threadedly engaging the support member 21. A clamp or clip 24 which may be made of springy metal, is provided, and the clip 24 includes a web 25 and a pair of spaced apart arms 26. Each of the arms 26 may be provided with an inwardly offset portion 27.

The numeral 28 designates a base which is provided with a pair of spaced apart openings 29 through which extend the guide pins 22, the base 28 having an inclined portion 37. Depending from the base 28 is a pair of spaced parallel legs 30, and secured to the lower ends of the legs 30 are a pair of cups 31. The cups 31 have the same size and shape, and each of the cups 31 includes an upper open end 32 and a lower curved bottom 33. Each cup 31 is provided with an aperture or opening 34 in the bottom thereof through which the oil is adapted to flow. Numerals 35 and 36 designate containers for holding oil, and the cups 31 are adapted to be simultaneously dipped into the containers 35 and 36, whereby when the cups are elevated, the rate of flow of the oil through the apertures 34 can be readily observed or ascertained.

In use, the portable kit contains the necessary equipment to determine fuel dilution, acidity and solid contamination in various fluids, such as lubricating oil. To use the kit, draw an oil sample from the hot engine, using the oil sampler device 16 provided. Fill the jar 35 marked "Test Oil" with the used engine oil to the oil level line. Next, fill the jar marked "Standard Dilution Sample," as indicated by the numeral 36, with a sample of new oil the same as used in the engine to the oil level line. Then, fill the dilution vial 41 with fuel of the type used in the engine to the per cent level line. Then pour the fuel from the dilution vial 41 into the new oil jar marked "Dilution Sample," as indicated by the numeral 36, and stir well.

To test for solid contaminants in the used oil, place one piece of circular paper of conventional construction on shelf 40, then insert the metal rod in the used oil jar 35, which is marked "Test Oil," and stir. Then, place one drop of oil on paper and wait ten minutes or until the oil no longer appears shiny or wet. Place the "Solid Contaminants Chart" which is a properly calibrated chart, over drop of oil to compare color of drop with color on chart. If the spot is the same color as the "Unsatisfactory" color on the chart, the oil or filter change is required. Discard the circular paper after the test.

To test for reaction or acidity, fill the reaction vial 39 to the line marked "Indicator Level" with the reaction indicator in the jars 19 and 20 by squeezing the bottle. Pour the used oil from the jar 35 into the same vial 39 to a line marked "Oil Level." Place the cap on the vial. Shake the vial vigorously for twenty seconds and then permit the vial to stand five minutes or until the oil and indicator separate. Compare the color of liquid in the lower level with the "Reaction (Acidity) Chart." If the color is yellow, the used engine oil is unsatisfactory and should be changed. Dump the oil out of the vial and wipe the vial with a clean rag.

To test for fuel dilution (diesel fuel or gasoline), measure the temperature of the oils in the test oil jar 35 and the standard dilution sample jar 36. Allow the oils to stand until the two temperatures are approximately equal, 1° F. differential being allowable. Lower the two metal viscosity cups 31 into the two beakers at the same time and wait until both cups are filled with oil. Withdraw the cups and hook in place at the top of the box by means of the member 24. Watch the flow of oil out of the holes 34 drilled in the bottom of the cups 31. If the oil stops flowing first from the cup containing "Test Oil,"

the used engine oil is diluted and should be changed. If the oil stops flowing first from the cup containing "Diluted Standard," the engine oil is still satisfactory.

The numeral 17 designates a thermometer which can be used for measuring the temperatures of the various oils, and the oils can be stirred by means of the stirring rod 42.

Heretofore, the fuel dilution of the used oil has been obtained by first heating the sample of new oil to a given temperature and measuring the flow of oil through an orifice, with a stop watch and the time of flow determined in seconds. Secondly, a sample of the used engine oil was heated and allowed to flow through an orifice and the time of flow was again measured. The time of flow was calculated to give dilution. The viscosity comparator described herein eliminates the use of heaters and stop watches and gives an immediate comparison between the used engine oil and the new oil, and the present invention is easy to use and gives accurate results.

The kit of the present invention is portable, unbreakable, and requires no electricity, and is very easy to clean, and the device will compare viscosity of two or more liquids in an accurate manner without the use of heaters, therenometers or stop watches. The old method was time consuming, since each liquid had to be tested separately, and also a source of heat was required and a thermometer to control the temperatures. A stop watch was necessary to time the flow of liquid through the orifice. The cups 31 can be made of any suitable material, such as metal or plastic, and the cups 31 are dipped into vessels 35 and 36 containing the two liquids to be compared. The cups are then withdrawn and the difference in the flow of the liquids is noted, so that stop watches and heaters are unnecessary. The two liquids to be compared are placed in individual containers and permitted to stand until their temperatures are alike. The comparator is immersed into the liquids and withdrawn. The liquid which stops flowing through the orifice first is less viscous than the other liquid. If desired, a check valve or the like can be incorporated in the apparatus to control the flow of oil through the orifice. The cups 31 have the same fluid capacity. The two cups 31 are adapted to be dipped into the fluid so that the cups fill with the fluid or oil and then the cups are lifted out of the fluid so that the liquid can flow out of the cups through the orifices 34.

The present invention is especially suitable for use aboard ships or the like, whereby there is provided a compact, portable oil test kit which is preferable to the separate pieces of laboratory equipment that are presently used aboard ships for testing of used diesel engine lubricating oil. The various containers can be made of a suitable material which will not break. With the present invention lubricating oils in diesel or gasoline engines can be tested to make sure that they are still in good condition so as to insure that the oils have not deteriorated. Thus, the oil can be tested for dilution, solid contamination, and corrosiveness, and the like. The cups 31 are attached together in such a manner that they can be simultaneously dipped into and withdrawn from the adjacent containers 35 and 36. The cups 31 are used to compare the viscosity of the used oil with that of a sample of the new oil diluted with a measured amount of fuel. The viscosity comparator can also be enclosed in a case and attached to an engine in such a manner that the engine oil from the engine is used to heat the standard new oil sample, and then continue to fill another jar. In this manner the standard oil sample maintains the same temperature as the used oil sample. The cups are then simultaneously dipped into the two oils and withdrawn. The oil flow through the cups determines the dilution of the used oil.

We claim:

1. In a viscosity comparator, a pair of vertically disposed guide pins, a base slidably engaging said pins, a pair of spaced parallel vertically disposed arms depending from said base, a pair of spaced apart cups secured to the lower ends of said arms, each of said cups having the same shape and size, there being a central opening in the bottom of each of said cups, said cups adapted to be simultaneously dipped into two separate containers of fluid, and a spring clip mounted at the top of said pins for frictionally engaging said base for selectively maintaining said cups in raised position.

2. In a viscosity comparator, a pair of vertically disposed guide pins, a base slidably engaging said pins, a pair of spaced parallel vertically disposed arms depending from said base, a pair of spaced apart cups secured to the lower ends of said arms, each of said cups having the same shape and size, there being a central opening in the bottom of each of said cups, said cups adapted to be simultaneously dipped into two separate containers of fluid, and a spring clip mounted at the top of said pins for frictionally engaging said base for selectively maintaining said cups in raised position, each of said cups having an open top and a rounded bottom.

3. In a viscosity comparator, guide pins, a base slidably engaging said pins, arms depending from said base, cups secured to said arms, each of said cups having the same shape and size, there being a central opening in the bottom of each of said cups, said cups adapted to be simultaneously dipped into two separate containers of fluid, and a spring clip mounted at the top of said pins for frictionally engaging said base for selectively maintaining said cups in raised position.

References Cited in the file of this patent
UNITED STATES PATENTS

| | | |
|---|---|---|
| 1,635,281 | Larson | July 12, 1927 |
| 2,024,720 | Cornell et al. | Dec. 17, 1935 |
| 2,091,222 | Thomas | Aug. 24, 1937 |
| 2,141,329 | Zahn | Dec. 28, 1938 |